(12) United States Patent
Horton et al.

(10) Patent No.: US 12,244,762 B2
(45) Date of Patent: Mar. 4, 2025

(54) CALLER IDENTIFICATION IN A SECURE ENVIRONMENT USING VOICE BIOMETRICS

(71) Applicants: Andrew Horton, Sarasota, FL (US); Sebastian Mascaro, Championsgate, FL (US)

(72) Inventors: Andrew Horton, Sarasota, FL (US); Sebastian Mascaro, Championsgate, FL (US)

(*) Notice: Subject to any disclaimer, the term of this patent is extended or adjusted under 35 U.S.C. 154(b) by 429 days.

(21) Appl. No.: 17/708,393

(22) Filed: Mar. 30, 2022

(65) Prior Publication Data

US 2022/0224792 A1 Jul. 14, 2022

Related U.S. Application Data

(63) Continuation-in-part of application No. 16/926,596, filed on Jul. 10, 2020, now Pat. No. 11,322,159, which is a continuation-in-part of application No. 16/715,938, filed on Dec. 16, 2019, now abandoned, which is a continuation of application No. 15/330,977, filed on Aug. 19, 2016, now Pat. No. 10,511,712.

(60) Provisional application No. 62/277,957, filed on Jan. 12, 2016.

(51) Int. Cl.
*H04M 3/42* (2006.01)
*G10L 17/00* (2013.01)
*G10L 17/04* (2013.01)
*G10L 17/06* (2013.01)
*H04M 3/22* (2006.01)
*H04M 3/537* (2006.01)

(52) U.S. Cl.
CPC ......... *H04M 3/42068* (2013.01); *G10L 17/00* (2013.01); *G10L 17/04* (2013.01); *G10L 17/06* (2013.01); *H04M 3/2281* (2013.01); *H04M 3/537* (2013.01); *H04M 2203/6054* (2013.01); *H04M 2250/74* (2013.01)

(58) Field of Classification Search
CPC .......... H04M 3/42068; H04M 3/2281; H04M 3/537; H04M 2203/6054; H04M 2250/74; H04M 2201/41; H04M 2203/2061; G10L 17/00; G10L 17/04; G10L 17/06; G10L 15/26; G10L 15/005
See application file for complete search history.

(56) References Cited

U.S. PATENT DOCUMENTS

| | | | |
|---|---|---|---|
| 5,721,827 A * | 2/1998 | Logan | G06F 16/64 709/217 |
| 5,732,216 A * | 3/1998 | Logan | H04H 60/46 725/86 |
| 9,237,232 B1 | 1/2016 | Williams et al. | |
| 10,742,799 B2 | 8/2020 | Broidy et al. | |
| 11,978,457 B2 * | 5/2024 | Medalion | H04N 7/15 |
| 12,057,106 B2 * | 8/2024 | Moya | G10L 15/063 |
| 12,113,934 B1 * | 10/2024 | Dempsey | H04M 3/42221 |

(Continued)

*Primary Examiner* — Lisa Hashem
(74) *Attorney, Agent, or Firm* — Ziegler IP Law Group

(57) ABSTRACT

A method of providing a transcription of an electronic communication includes determining a language spoken in the electronic communication, differentiating among participants in the electronic communication, identifying a hierarchy of topics discussed in the electronic communication, and providing a display of the hierarchy of topics.

30 Claims, 13 Drawing Sheets

(56) References Cited

U.S. PATENT DOCUMENTS

| | | | |
|---|---|---|---|
| 2002/0032591 A1* | 3/2002 | Mahaffy | G10L 13/00 |
| | | | 706/45 |
| 2013/0044867 A1 | 2/2013 | Walters et al. | |
| 2020/0366786 A1 | 11/2020 | Broidy et al. | |
| 2024/0095446 A1* | 3/2024 | Mane | G06F 40/216 |
| 2024/0176960 A1* | 5/2024 | Maurer | G06F 16/345 |
| 2024/0193231 A1* | 6/2024 | Dwivedi | G06F 40/30 |
| 2024/0232327 A1* | 7/2024 | Maiman | G06F 21/629 |
| 2024/0233733 A1* | 7/2024 | Medalion | G10L 17/00 |
| 2024/0233745 A1* | 7/2024 | Maxwell | H04N 7/147 |

* cited by examiner

| | | | |
|---|---|---|---|
| | 1502 | 1504 | 1506 | 1508 |
| Word(s) | Combined | Inmate | Civilian |
| Right | 338 | 186 Utterance in 62 calls | 152 Utterance in 58 calls |
| Love | 226 | 119 Utterance in 53 calls | 107 Utterance in 51 calls |
| look | 187 | 79 Utterance in 38 calls | 108 Utterance in 45 calls |
| time | 162 | 88 Utterance in 42 calls | 74 Utterance in 38 calls |
| work | 161 | 89 Utterance in 38 calls | 72 Utterance in 32 calls |
| little | 151 | 77 Utterance in 38 calls | 74 Utterance in 45 calls |
| day | 140 | 86 Utterance in 40 calls | 54 Utterance in 24 calls |
| sure | 137 | 72 Utterance in 40 calls | 65 Utterance in 41 calls |
| thing | 118 | 86 Utterance in 33 calls | 55 Utterance in 24 calls |
| cool | 118 | 72 Utterance in 37 calls | 49 Utterance in 36 calls |
| money | 113 | 76 Utterance in 41 calls | 37 Utterance in 32 calls |
| sorry | 101 | 53 Utterance in 23 calls | 48 Utterance in 24 calls |
| people | 97 | 53 Utterance in 28 calls | 44 Utterance in 23 calls |
| man | 96 | 53 Utterance in 28 calls | 43 Utterance in 27 calls |
| new | 95 | 62 Utterance in 37 calls | 33 Utterance in 29 calls |
| food | 88 | 33 Utterance in 23 calls | 55 Utterance in 25 calls |

FIG. 15

CALLER IDENTIFICATION IN A SECURE ENVIRONMENT USING VOICE BIOMETRICS

BACKGROUND

This application generally relates to a system and method for identifying callers in secure environments, such as correctional facilities, by using voice biometrics, wherein the identity of speakers in both directions in calls originating either inside or outside the facility are of great interest to the management of such facilities. Furthermore, there has been an evolution from determining not just the identity of the speakers but also the subjects discussed by the speakers. This has become important as the callers in the secure environments become more sophisticated in obscuring subjects being discussed, for example, by using non-traditional words and assigning alternate meanings to words and phrases.

In addition to a need to identify all callers in controlled environments, such as corrections facilities, military bases, or government institutions, referred to collectively as secure facilities, there is a need to identify the subject matter being discussed. Voice identification systems are needed when the speaker is not otherwise known, but the ability to discern particular words and phrases and their meanings, across a spectrum of different languages is also important. The disclosed embodiments will materially contribute to countering terrorism and general lawlessness and unrest within secure facilities by increased detection and surveillance of electronic conversations within secure facilities. The proliferation of different types of electronic conversations, using different technologies including cellular communications in secure facilities increases the chance that high-risk inside participants may continue to plan illegal activities even while in detention. Traditional means of monitoring electronic communication traffic may be impractical, may infringe civil liberties of outside participants, or may simply be ineffective. Furthermore, only a limited analysis of the communications may be performed due to limited resources.

Prior art solutions providing caller identification using voice biometrics have limitations. Prior art formal enrolment of users is an especially cumbersome and time-consuming process because a reliable prior art enrolment requires a substantial amount of speech to be captured and typically requires cooperation of the caller. To date, this has limited the adoption of voice biometrics as a means of telephone-based authentication in secure facilities.

Systems of the prior art typically compare a voice sample from the speaker against an existing library of previously-acquired and archived Biometric Voice Prints (BVPs). Verification typically occurs only at the beginning of an interaction and, once achieved, is considered as valid for the whole interaction. This does not allow for instances wherein the validation of the individual's identity can be completed correctly, but the interaction is then taken up by another party. This is a serious potential flaw for those interactions requiring a very high standard of identity verification.

Furthermore, prior art systems are not capable of discerning the actual meaning being conveyed during the communications. As mentioned above, callers in secure environments become more sophisticated in obscuring subjects being discussed, for example, by using non-traditional words and phrases that have been assigned alternate meanings.

What is needed is a voice recognition system that monitors the identity of the actual speakers continuously over the lifetime of a call originated in either direction. What is also needed is an analysis system that is capable of identifying language constructs that may have hidden meanings or may be used to convey meanings that are obscured.

U.S. Patent Application No. 2013/0044867 to Walters et al. teaches the use of voice biometric software to analyze inmate telephone calls. A system and method for managing and controlling telephone activity in a correctional facility comprises providing a first communicative connection between a caller and a recipient, delivering the conversation between the caller and the recipient over the first communicative connection and executing voice biometrics software to evaluate the conversation. A detection response is executed based upon the evaluation of the biometrics software.

U.S. Pat. No. 9,237,232 to Williams et al. discloses systems and methods for analyzing digital recordings of the human voice in order to find characteristics unique to an individual. A biometrics engine may use an analytics service in a contact center to supply audio streams based on configured rules and providers for biometric detection. The analytics service may provide ca audio data and attributes to connected engines based on a provider-set of selection rules. The connected providers send call audio data and attributes through the analytics service. The engines are notified when a new call is available for processing and can then retrieve chunks of audio data and call attributes by polling an analytics service interface. A mathematical model of the human vocal tract in the call audio data is created and/or matched against existing models. The result is analogous to a fingerprint, i.e., a pattern unique to an individual to within some level of probability.

Patent application 2013/0044867 to Walters and U.S. Pat. No. 9,237,232 to Williams have no disclosed capability for continuously monitoring the identity of the caller over the lifetime of a call, nor for ensuring that the same persons are talking through the call, nor to generate an alert if another party is added to the call. Further, the systems are directed to identifying an incoming caller but makes no provision for identifying the receiving party as well, which can be vital within a secure environment such as a prison. Further, the system is not configured for identification of persons outside a secure environment who are receiving calls from within the secure environment. Still further neither Walters nor Williams are capable of identifying language constructs that may have hidden meanings or may be used to convey meanings that are obscured.

U.S. Pat. No. 10,742,799 to Broidy et al. discloses a system that obtains audio and metadata information from voice calls, generates textual transcripts from those calls, and makes the resulting data searchable via a user interface. Searches can be performed for, and alerts may be generated based on, callers, callees, keywords, and/or other information. Further the system generates semantic content of the calls. However, U.S. Pat. No. 10,742,799 to Broidy has no disclosure related to identifying words and phrases that may have hidden meanings or may be used to convey meanings that are obscured.

U.S. Patent Application No. 2020/0366786 to Broidy et al. is directed to accessing information related to telephone calls initiated from, or received at, a correctional facility, that includes storing transcripts and metadata related to the call in a database, creating data analytics related to the calls, and providing a user interface for displaying data and filtering the data. However, 2020/0366786 to Broidy has no disclosure related to identifying words and phrases that may have hidden meanings or may be used to convey meanings that are obscured.

Systems of the prior art are also limited in their focus on the calling party as opposed to the called party. Inside participants, in particular, are generally allowed to call only a restricted list of phone numbers, typically family or friends. No prior art system currently is able to verify the identity of the called party, which could be a major source of fraud.

In current systems, calls are typically initiated by the inside participant to the outside world. However, there is a need for telephone systems that can identify callers from the outside while allowing such callers to initiate calls and leave voice-mails for inside participants, although the practical impossibility of formally enrolling every potential caller has prevented the deployment of such solutions.

Currently, biometric identification is not used in voice-mail systems as part of communications networks in secure facilities in part because of the difficulty in identifying callers. This is a major security risk since most of the communication allowed in a correctional environment is based on the premise that the facility always knows who is involved in the conversation. Current generation voicemail products do very little, if anything, to identify the person that is leaving the message for the inside participant. The prior art process is usually as follows, though some variations exist among providers:

1) friend/family member calls a toll-free number;
2) IVR provides the option for Voice Mail; this could be one of many options for the caller;
3) system checks that funds are available in the friend and family member's prepaid account (this process could occur in a different order);
4) once the Voice Mail option is selected, the following options may exist in the system:
 a) the system may check to see which inside participants may have called the caller; these would be the options/ inside participants that are offered to the caller to leave a Voice Mail;
 b) alternatively, the system may ask the caller to input the ID of the inside participant for whom the caller would like to leave a message; (Note that the system could theoretically search for the inside participant as well, based on name, etc.)
5) caller leaves a Voice Mail up to a time limit (limits range typically from one to three minutes).

There is therefore a need for a system capable of accurately and automatically identifying the caller without the need for a formal enrollment process or specialized staff, and capable of ensuring that the same participant or participants are talking throughout a call.

SUMMARY

In at least one aspect, the disclosed embodiments are directed to a method of providing a transcription of an electronic conversation. The method includes determining a language spoken in the electronic conversation, differentiating among participants in the electronic conversation, identifying a hierarchy of topics discussed, and providing a display of the hierarchy of topics.

The electronic conversation may be a live or recorded electronic conversation.

The live or recorded electronic conversation may be at least one of a telephone call, video call, email; text message, streaming audio and video, or audio loaded from outside sources.

The language spoken in the electronic conversation may be determined using a selection from a library of languages.

The selection may be made from the library based on a best match of one or more of intonations, phonetic pronunciations, and vocabulary.

The method may include inserting a tone in a particular participant's portion of the electronic conversation to differentiate among the participants.

The topics may be identified using machine learning.

The topics may be identified using rule based criteria.

The topics may be identified using user defined criteria.

The topics may be identified by identifying the topics by indexing words of the electronic conversation in a lattice matrix database with a best match and alternatives for each word.

The method may include displaying the hierarchy of topics illustrating most pronounced topics in a larger font.

The method may include providing a searching facility to search the electronic conversation for one or more of a topic, a particular word, phrase, sentence, or paragraph, a particular participant's voice, a particular language, a particular destination number, or a particular participant's gender.

The method may include providing alerts based on one or more criteria including a topic, a particular word, phrase, sentence, or paragraph, a particular participant's voice, a particular language, a particular destination number, or a particular participant's gender.

The method may still further include transcribing the audio files to a text format.

The audio files may be transcribed in any combination of automatically, on demand, and as the audio files are rendered.

Transcribing the audio files to a text format may include using an automatic language detection process to distinguish languages spoken by the speakers.

Transcribing the audio files to a text format may include using a language model, acoustic model, and pronunciation engine to compute hypotheses of words spoken in the audio files to determine a transcription result.

BRIEF DESCRIPTION OF THE DRAWINGS

In the following detailed portion of the present disclosure, the embodiments disclosed herein will be explained in more detail with reference to the example embodiments shown in the drawings. These embodiments are non-limiting exemplary embodiments, in which like reference numerals represent similar structures throughout the several views of the drawings, wherein:

FIG. 11 shows an exemplary user interface 1100 for generating a report.

FIG. 12 shows a portion of a user interface that allows a user to filter report results;

FIGS. 14 and 15 illustrate exemplary reports that present most frequently said words.

DETAILED DESCRIPTION

Figure 1:
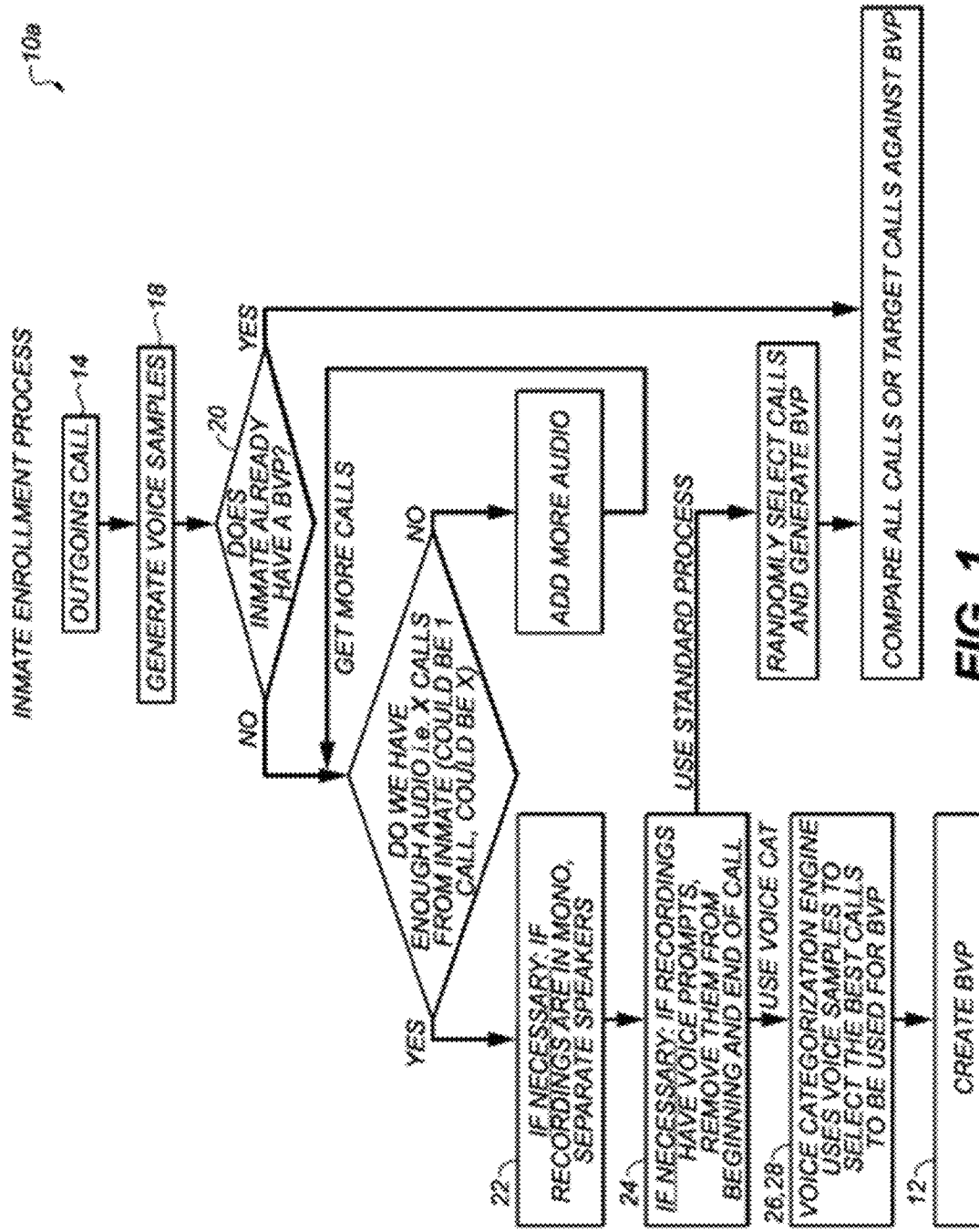
FIG. 1 is a schematic flow diagram showing an exemplary process in accordance with the disclosed embodiments for enrolling an inside participant (inmate) in the caller identification system.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirits and scope of the present disclosure. Thus, the present disclosure is not limited to the embodiments shown, but to be accorded the widest scope consistent with the claims.

For purposes of this disclosure:

Electronic communications refer to live or recorded telephone calls, video calls, email; text messages, streaming audio and video, audio loaded from outside sources, or any other communication facilitated by electrical, electromagnetic, or optical transmission;

Channel refers to a portion of an electronic communication;

Participant refers to anyone participating in an electronic communication;

Inside participant refers to a participant resident in, or confined to, a secure facility;

Outside participant refers to a participant outside of, or not confined to, a secure facility;

Secure facility refers to a controlled environment, such as a corrections facility, military base, or government institution;

User refers to a non-participant with the ability to use the disclosed processing engines for monitoring and analyzing electronic communications and generating reports; and Utterance refers to a whole or partial word, phrase, sentence, paragraph or other sound that may be made by a participant.

A novel system and method are disclosed to enroll and authenticate individuals inside and outside secure facilities using audio data in any format, for example, live or pre-recorded video, audio, or any other type of call or recording, originating from any source, for example, land line or wireless live calls, pre-recorded calls, voice mail messages, video or audio messages, and video or audio recordings of any type. The system and method may provide the ability to:

Utilize any suitable audio format;

Automatically convert the audio data to a format suitable for biometric processing;

Separate different channels present in the audio data;

Separate persons participating in the call, referred to as inside or outside participants, in the audio data;

Create individual biometric voice print databases; and

Transcribe and index audio data for keyword searching.

The system and method may also provide the capability to continuously monitor the identity of one or more participants in any audio format. The enrollment and authentication process, as described in greater detail hereinbelow, may be undetectable by the participants.

The system significantly reduces costs because there is no need to formally enroll participants, which typically requires substantial supervisor's time during the enrollment process. Further, the process is text and language independent. An initial BVP for a speaker may be generated from a segment of audio data having a predetermined length.

Some of the disclosed embodiments may have the ability to automatically create BVPs of outside participants that are Persons of Interest (POIs). A system limited to authenticating only inside participants that are POIs would offer limited incremental value over other forms of authentication. The secure facility knows the general location of any inside participant at all times and an inside participant from within the facility can only be one among a very limited set of possible candidates, depending on the housing breakdown. On the other hand, a real need for the facility is the ability to identify outside participants receiving outgoing calls from within the facility who could possibly be involved in a criminal activity in collusion with the inside participants. The current disclosure describes an automated process to create BVPs for the inside participants as well as the outside participants in calls originating either inside or outside a facility, and to create BVPs from any source of audio data originating from inside or outside the facility.

In a world where a telephone number is largely meaningless for identification purposes, being able to authenticate participants by voice alone is a critical feature. Previous methods of the prior art, requiring a formal enrollment process of all participants, make this impossible. The process of the current disclosure makes authenticating by voice alone a reality by being able to use a recording to create a BVP of a first time participant, and then to monitor participant identities during the remainder of a call.

1. Passive Enrollment of Speakers

In at least one embodiment, a high quality BVP can be generated from processing recordings of multiple calls.

In at least one embodiment, the system can process calls recorded at different times and from different numbers and may capture different characteristics of the participant's voice, training the system to recognize the participant in different circumstances, and produces a high-quality BVP.

2. Creation of a BVP without Formal Enrollment

In at least one embodiment, the system of the disclosure relies on a plurality of pre-recorded calls to create a BVP of a participant without formal enrollment. The BVP can also be produced during a live call.

Figure 2:
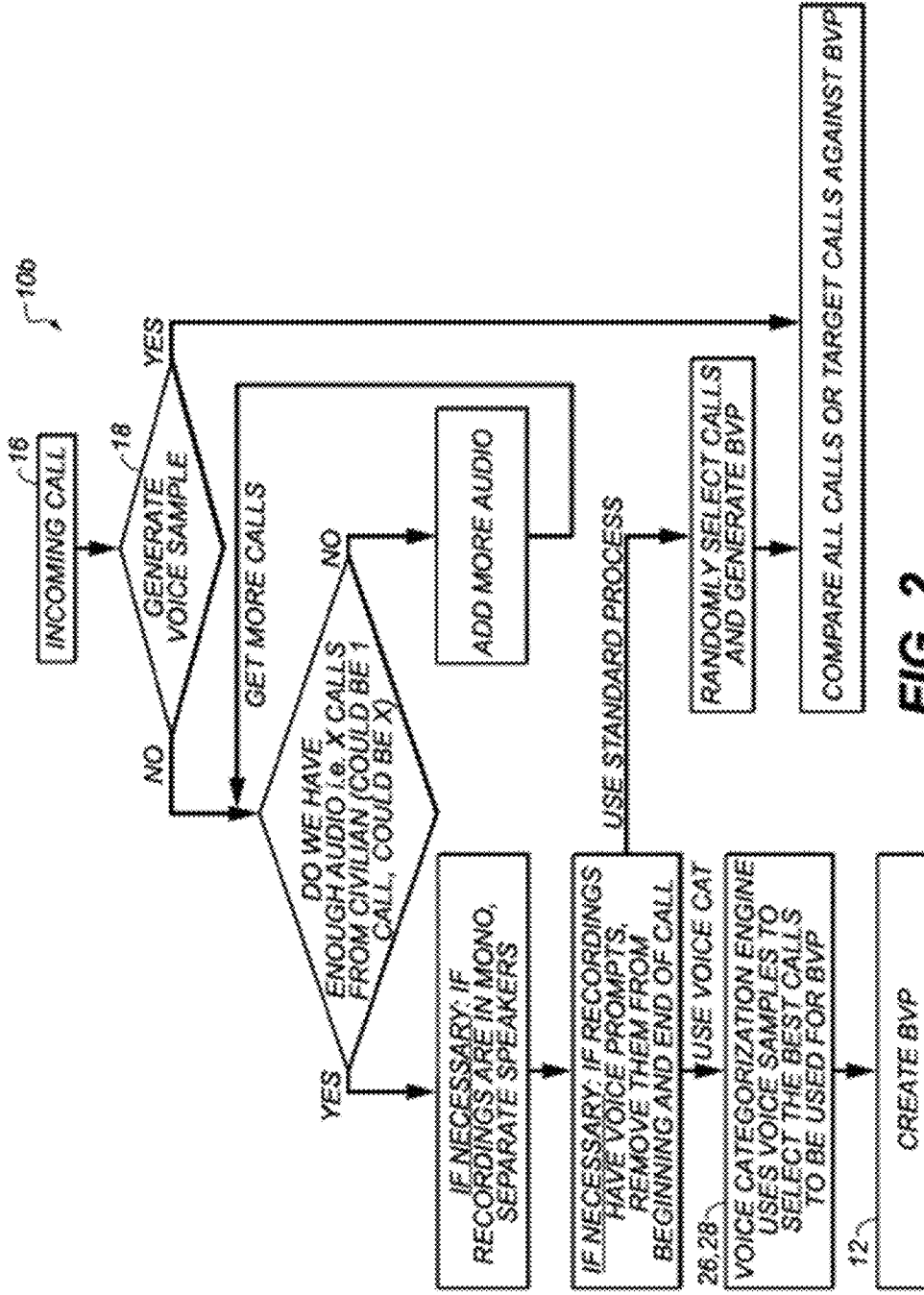
FIG. 2 is a schematic flow diagram showing an exemplary process in accordance with the disclosed embodiments for enrolling an outside participant (civilian) in the caller identification system.

Referring to FIGS. 1 and 2, an exemplary process 10a,10b for creating a BVP 12 is similar for either an inside participant (inmate) making outgoing calls 14 or an outside participant (civilian) making incoming calls 16 and comprises the steps of:
 a) downloading 18 at least one recorded call 20 from a participant;
 b) separating 22 the participants in each recording through a speaker separation process;
 c) preprocessing 24 the calls to normalize volume, suppress silences, and reduce ambient noise, and trimming the beginning and end of each recording to remove telephone system prompts;
 d) selecting 26 a plurality of recording segments judged to have the highest quality; and
 e) processing 28 the selected segments to create a BVP for the participant.

3. Authentication of Incoming or Outgoing Speaker with Existing BVP

Figure 3:
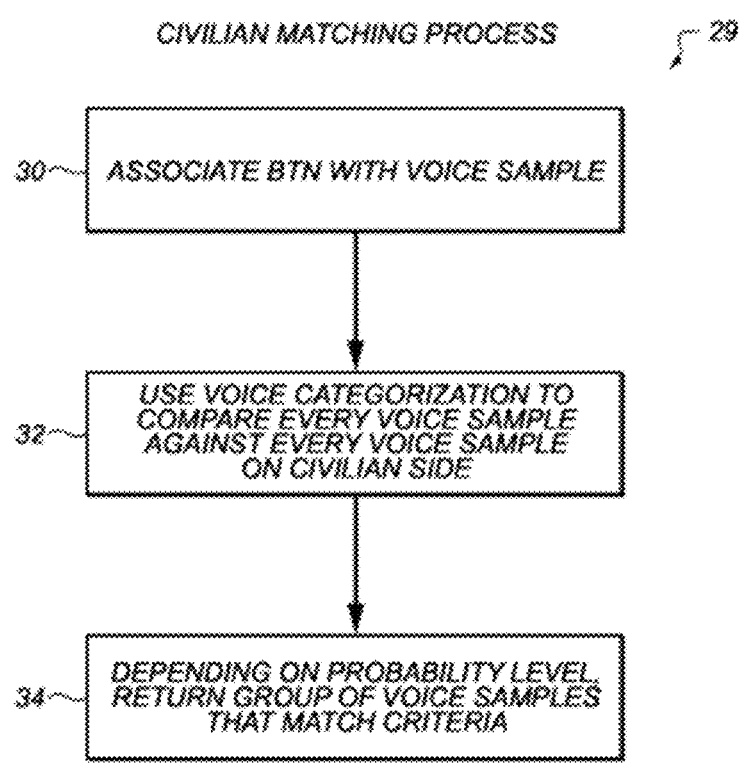
FIG. 3 is a schematic flow diagram showing how the system matches an outside participant (civilian) voice and associated billing telephone number via voice categorization to identify an outside participant (civilian)

If an outside participant, (a caller, e.g., a civilian caller) 29 as shown in FIG. 3, has a BVP already stored in the system, at least one exemplary authentication process may include:
 a) uploading the call from the outside participant;
 b) associating 30 the Billing Telephone Number (BTN) with a voice sample of the outside participant (civilian caller);
 c) preprocessing the voice sample to normalize volume, suppress silence, and reduce ambient noise;
 d) separating the speakers in each recording through a speaker separation process to isolate a single speaker as the outside participant;
 e) trimming the beginning and end of the call to remove telephone system prompts;
 f) extracting at least seven seconds of net speech of the outside participant;
 g) using Voice Categorization 32 to process the extracted net speech by comparing every incoming voice sample against every voice sample existing in the outside participant (civilian) biometric voice print database; and
 h) matching 34 the speaker to a BVP by identifying all existing voice samples matched by the incoming voice sample.

The system may be able to identify one or both participants during a call, which permits the system to operate in real time and to continue to confirm participant identification throughout the duration of the call.

In another embodiment, the process may also be run in real time via Continuous Window Processing to determine throughout the length of a call whether any of the speakers have changed. An occasion where this is useful is if the inside participant is on a watch list and the agency wants to know who is leaving him a voice mail in real time.

Figure 4:
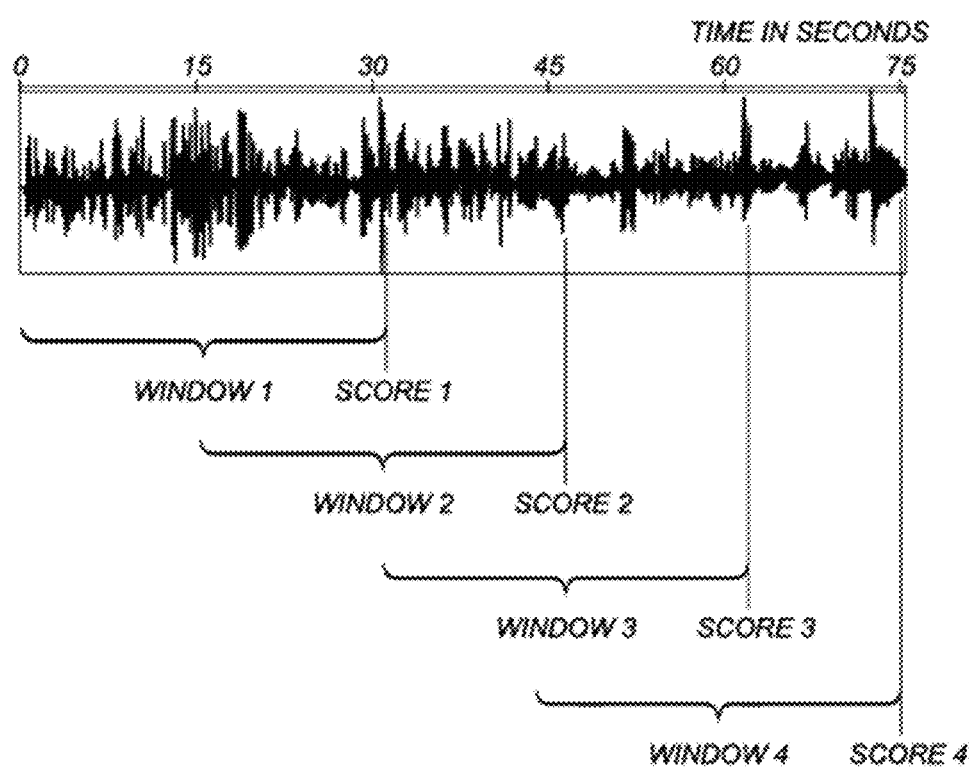
FIG. 4 is an exemplary voice print of a telephone call showing the use of overlapping windows of analysis to maintain voice identification throughout the call.

Referring to FIG. 4, the system may be able to be configured to process any desired length of time window of an incoming call to yield a voice ID score. For example, if the default time window size is 30 seconds, as shown in FIG. 4, the first voice ID score may be returned by the system 30 seconds into the call. However, the next window may be started 15 seconds into the call and may end 30 seconds later at 45 seconds into the call, generating a second voice ID score which may be compared to the first voice ID score generated 15 seconds previously. The overlap may ensure that during the call every second of the call may be used for participant identification, e.g., FIG. 4 shows four overlapping 30 second windows 1 through 4 and voice ID scores 1 through 4 for a call of 75 seconds. In some embodiments the test windows may be of equal length. In one example the first test window is between 7 and 30 seconds in length, and said second test window begins between 3.5 and 15 seconds into the call.

4. Passive Enrollment of Outside Parties

One aspect of the current disclosure is the ability to create a BVP of a called party, whether inside or outside a facility, without the need for formal enrollment. In at least one embodiment, the voice print of every participant is processed against the biometric voice print database. If no match is found, a trigger may automatically generate the creation of a new BVP. That person will be assigned by default the name of the called party, if known.

In another embodiment, a trigger for producing a BVP is based on the output from a data mining algorithm whose output is an Actionable Intelligence Potential (AIP) or Actionable Intelligence Score (AIS). The AIP/AIS is generated by mining the connections between the individual that has been called and other inmates/calls, emails, communications, financial transactions, etc. The trigger is based on one or more thresholds that can be adjusted as a function of the probability that the target speaker is a known POI.

In another exemplary embodiment, a trigger to create a BVP is based on certain keywords identified either automatically or manually by an investigator listening to a phone call. The investigator can then request that the system create a BVP for the individual, if a BVP does not already exist, and begin the process of searching for those calls based on the individual's voice.

The identification process for this embodiment may include the following:
 a) uploading the call of the called party;
 b) preprocessing the call to normalize volume, suppress silences, and reduce ambient noise;
 c) separating the speakers in each recording through a speaker separation process;
 d) trimming the beginning and end of the call to remove telephone system prompts;
 e) extracting at least seven seconds of net speech of the called party;
 f) processing the net speech of the called party against the BVP database;
 g) matching the called party to a BVP;
 h) if no match is found, triggering the creation of new BVP from the call;
 i) if less than 30 seconds of net speech is available from the call, searching the biometric voice print database for additional calls involving the called party;
 j) if no other calls involving the called party can be found, then setting an alarm against the called party to use future calls to trigger creation of a new BVP; and running the biometric voice print database against newly created BVP.

This procedure may be followed in real time, defined herein as being on a live telephone call rather than a recorded call. The call is processed through a Session Initiation Protocol (SIP) server which analyzes the call. After 7 seconds of speech, the system can identify the caller.

In at least one embodiment, a cross-reference is kept of every incoming and outgoing telephone number against the BVPs of all inmates. Biometrics on voice mail recordings can be used, e.g., as follows:
 1) identify the caller;
 2) determine whether the caller is an ex-inmate/parolee (a POI);
 3) alert the facility of a person of interest/under investigation who is leaving a voice mail;

4) identify instances of one caller using multiple numbers to leave VMs for the same inmate, or for multiple inmates.

5. Enhancement of BVPs

Enhancing an existing BVP over time may increase the identification accuracy of the BVP. A poor quality BVP will result in more false positive and false negative results. A BVP can be of poor quality for a number of reasons including, but not limited to one of the calls used to generate the BVP may erroneously include another speaker's voice, or the calls used were not of high quality to begin with, or more audio is needed to ensure that the BVP is of the highest quality. In some embodiments a proprietary algorithm automatically identifies BVPs that could use enhancement if they are consistently receiving poor identification scores. The system expects that if the correct person is being run against the BVP a certain threshold score should be attained; if it is not, the system flags the BVP for enhancement.

The enhancement can occur using multiple techniques. One exemplary method by which the algorithm enhances the BVP is by using a call that has been through the identification process and has been assigned an exceptionally high score. This indicates that this call is an excellent representative sample of the person that is being identified and, as such, should be used to improve the BVP. This enhancement will make future identifications better as well as the BVP is what drives the accuracy of the system. This method of improvement can be used over and over to improve the BVP.

An additional exemplary method is a scheduled process whereby the system, after a designated period of time (e.g., week, month, three months, six months, etc.) selects the highest scoring identified calls and uses them to improve the appropriate BVPs (a call identified with a very high score for a particular individual is used to improve that individual's BVP). This process automatically occurs during the designated periods, ensuring that the BVP continues to improve and be of high quality.

6. Cluster Matching of BVPs

There are circumstances where calls may have been assigned to a default identifier. This would be, for instance, when an outside participant calls in, is unable to be identified, and is assigned to a particular calling number. The system may not be able to identify the outside participant from the biometric voice print database. At a later date, the same outside participant may call in and be personally identified. The original call assigned to the calling number is then reassigned to the newly identified outside participant, forming a call cluster. Additional calls from this or other numbers identified as including this outside participant may be added to the cluster with the goal of grouping the audio files by participant. This may be accomplished by iteratively grouping the audio files based on a predetermined matching criteria, for example, participant ID scores, until no more clusters may be merged or a particular stopping criteria is met, for example, different participants from the same conversation may not be merged.

Figure 6:
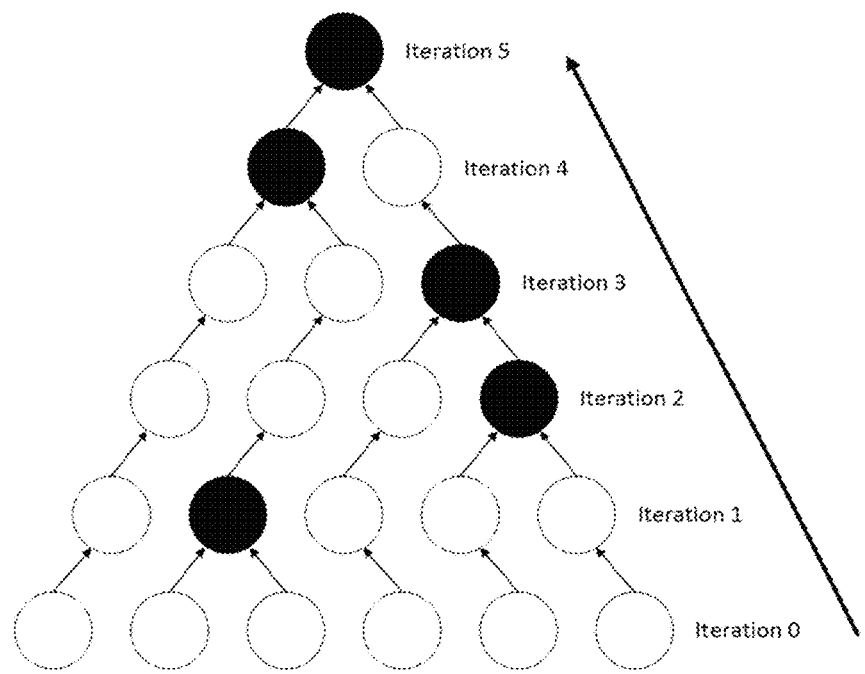
FIG. 6 shows an exemplary simple clustering where at each iteration, 2 files with the closest scores may be grouped.
Figure 7:
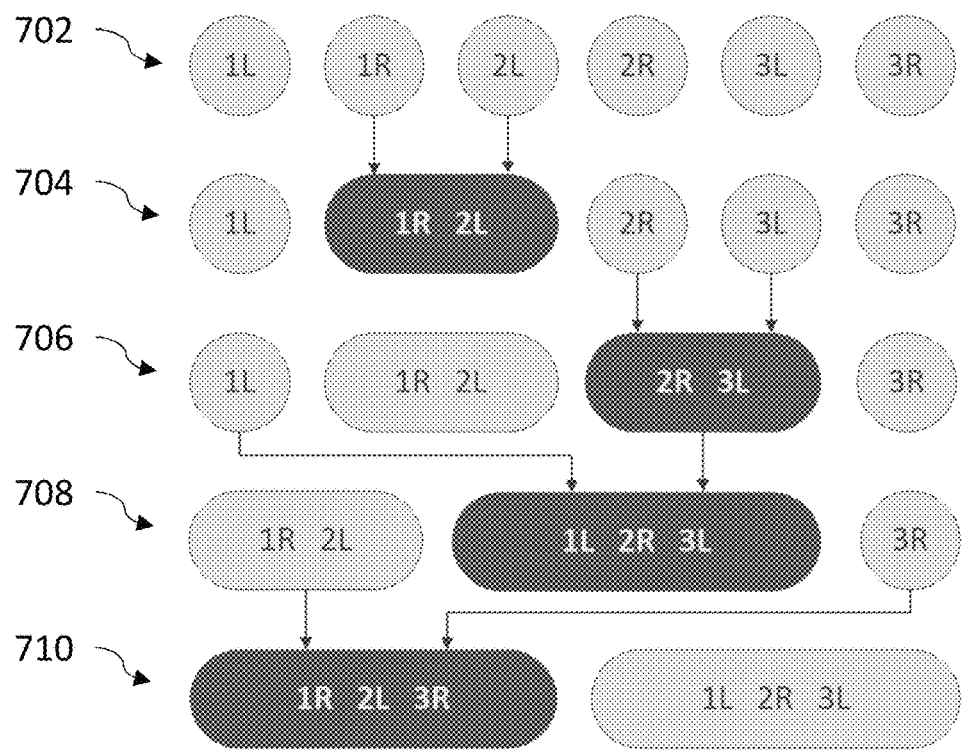
FIG. 7 depicts a more complex clustering scheme that may be implemented during enrollment.

FIG. 6 shows an exemplary simple clustering where at each iteration, 2 files with the closest scores may be grouped. FIG. 7 depicts a more complex clustering scheme that may be implemented during enrollment. In the first row 702, 3 calls are under consideration with participants in left and right channels of each call. In the second row 704, the right channel participant in call 1 and the left channel participant in call 2 have participant ID scores that meet a correlation threshold and are clustered together. In the third row 706, the right channel participant in call 2 and the left channel participant in call 3 have participant ID scores that meet a correlation threshold and are clustered together. In the fourth row 708, the left channel caller in call 1 and the cluster of the right channel participant in call 2 and the left channel participant in call 3 have participant ID scores that meet a correlation threshold and are clustered together. In the fifth row 710, the cluster of the right channel participant in call 1 and the left channel participant in call 2, and the right channel participant in call 3 have participant ID scores that meet a correlation threshold and are clustered together, resulting in two clusters. Provided that the correlation threshold ensures that the participants are the same with an acceptable uncertainty factor, the clustering scheme should end with larger clusters of same participants and smaller clusters of other participants. Clustered biometric voice prints may be generated from the clusters of same participants.

Figure 8:
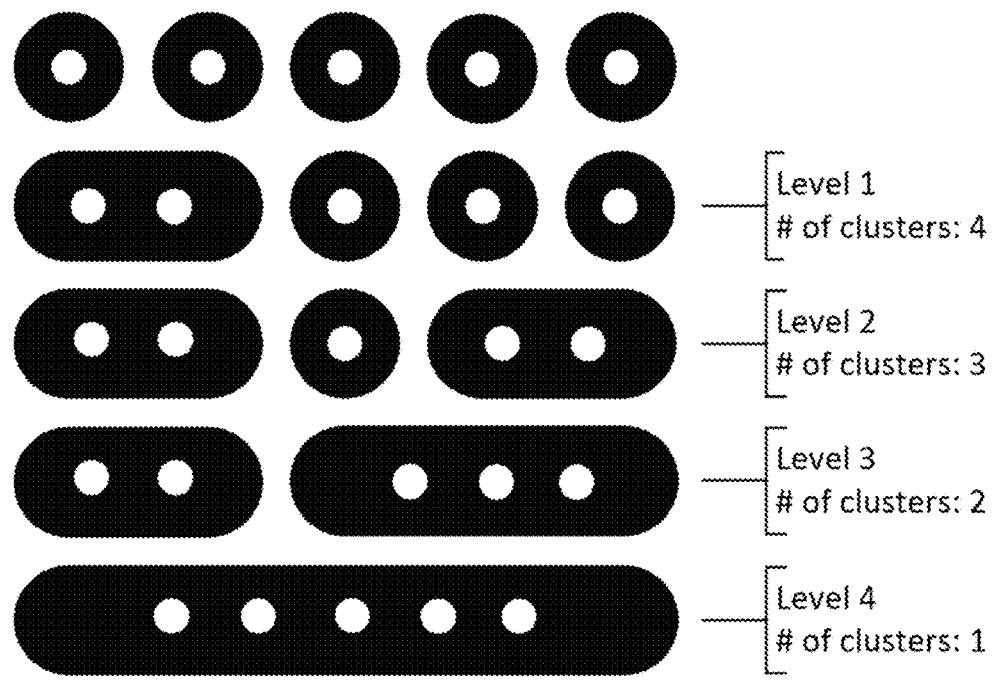
FIGS. 8 and 9 show examples of results of a general purpose clustering technique according to the disclosed embodiments.
Figure 9:
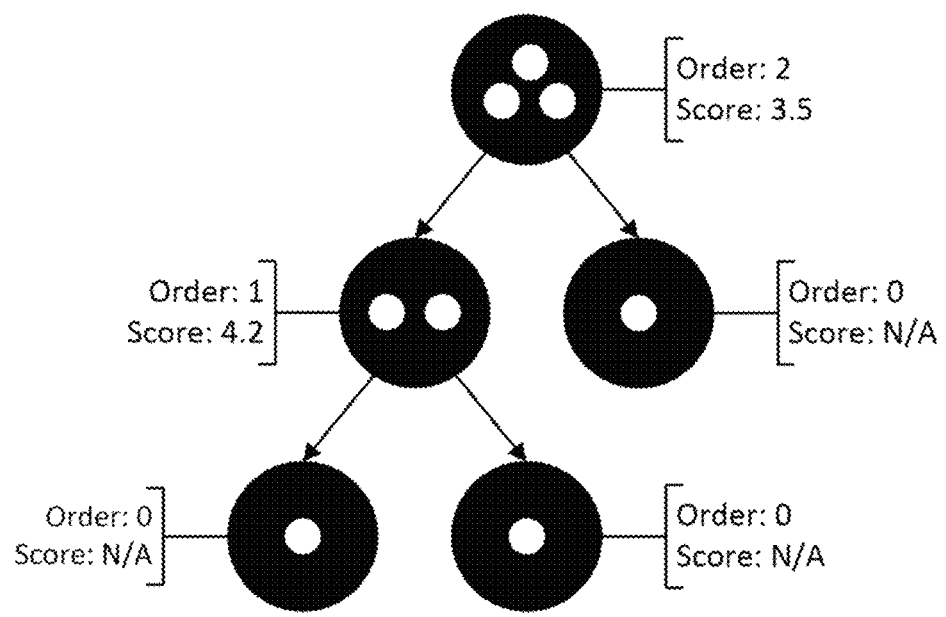

FIGS. 8 and 9 show examples of results of a general purpose clustering technique where the clustering proceeds without a stopping criteria but with the same correlation requirements. When merging is complete, the whole clustering tree is available for review and may be examined in various ways. For example, FIG. 8 shows a view by levels, where the clustering tree has 4 merge levels with decreasing numbers of clusters until at level 4 there is a single cluster. FIG. 9 shows a view from top to bottom as a binary tree.

The clustering process generally results in accurate clustering because it utilizes an everything against everything match and may be utilized in biometric voice print creation and incorporating outside participants into the biometric voice print database. The clustering process operates to automatically select audio files from within a pre-existing group of calls and select most appropriate audio files for biometric voice print creation based on the similarity of voice characteristics. The resulting biometric voice print is more accurate having been generated from a number of audio files with similar voice characteristics.

The clustering process incorporates outside participants into the biometric voice print database by clustering audio files with similar voice characteristics regardless of where the calls in the audio fields originate. Prior biometric identification systems generally ignore calls originating external to secure facilities due to technological challenges, and an inability to biometrically link inside and outside participants. The disclosed clustering technique allows for characterizing participants regardless of whether they are internal or external. Exemplary applications include the ability to find outside participants that are using multiple telephone numbers as well as to see how many outside participants may be using a single telephone number. The introduction of a biometric identification for a participant leaving a voice mail is invaluable for intelligence personnel and agencies. Often, the facility has a general idea of who should be tied to that number since the friends and family members often deposit funds for their loved ones in the prison and, in order to do so, must confirm their identity. This gives the process a starting point to match the person's voice to a telephone number. However, oftentimes there is no place to start in terms of identifying the caller. This is where proprietary software comes into use. Having the ability to voice print both sides of a call, the software can already have a voice associated with that number from previous calls to or from that number. The system then checks to see if the new voice print is a positive match. (Additionally, a voice mail is an excellent basis from which establish a voice print, as such a call is simply the person talking without interruption.) The system can create a BVP from the caller based on a voice mail and use it to identify the caller in the future. The biometric process can occur after the voice mail has been completed in an offline process. This can be the most efficient means of identifying the callers as each voice mail recording is run against the biometric voice print database of BVPs, and the identity with the accompanying score is returned.

Additional Embodiments

Further embodiments will now be disclosed that provide enrollment and authentication of individuals both inside and outside secure facilities using audio data in any format, for example, live or pre-recorded video, audio, or any other type of call or recording, originating from any source, for example, land line or wireless live calls, pre-recorded calls, video or audio messages, and video or audio recordings of any type. The disclosed embodiments may provide the ability to:
  utilize any suitable audio format;
  automatically convert the audio data to a format suitable for biometric processing;
  separate different channels present in the audio data;
  separate persons participating in the call, referred to as participants, in the audio data;
  create individual biometric voice print databases; and
  transcribe and index audio data for keyword searching.

The disclosed embodiments may provide a user with enhanced capabilities within the disclosed systems and methods for managing biometric functions on audio sourced from both within and external to secure facilities.

Figure 5:
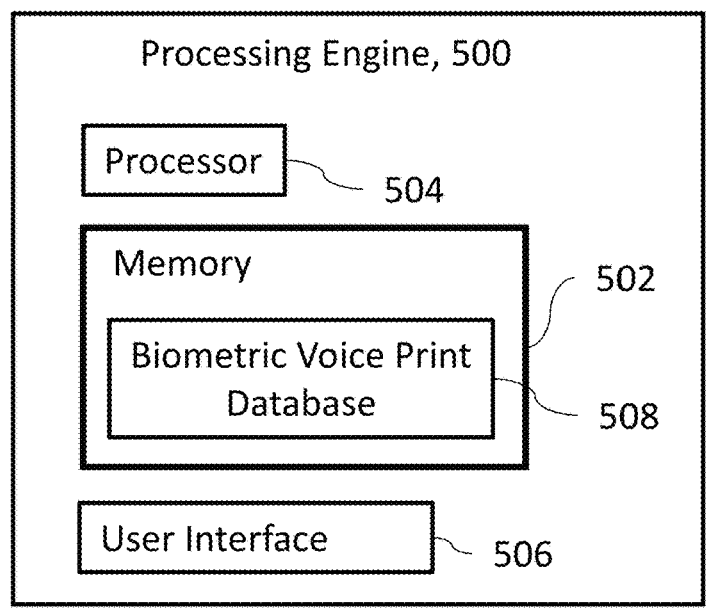
FIG. 5 illustrates an exemplary architecture of a processing engine for implementing the system and method disclosed herein.

FIG. 5 illustrates an exemplary architecture of a processing engine 500 for implementing the system and method disclosed herein and for performing the functions of the disclosed embodiments. The processing engine 500 may include computer readable program code stored on at least one computer readable medium 502 for carrying out and executing the process steps described herein. The computer readable program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or any other suitable programming languages. The computer readable program code may execute entirely on the processing engine 500, partly on the processing engine 500, as a stand-alone software package, partly on the processing engine 500 and partly on a remote computer or server or entirely on the remote computer or server. In the latter scenario, the remote computer may be connected to the processing engine 500 through any type of suitable network.

The computer readable medium 502 may be a memory of the processing engine 500. In alternate aspects, the computer readable program code may be stored in a memory external to, or remote from, the processing engine 500. The memory may include magnetic media, semiconductor media, optical media, or any media which is readable and executable by a computer. In some embodiments, the biometric voice print database 508 may be located in the memory of the processing engine 500. The processing engine 500 may also include a computer processor 504 for executing the computer readable program code stored on the at least one computer readable medium 502. In at least one aspect, the processing engine 500 may include one or more input or output devices, generally referred to as a user interface 506 which may operate to allow input to the processing engine 500 or to provide output from the processing engine 500, respectively. The processing engine 500 may be implemented in hardware, software or a combination of hardware and software. Furthermore, the processing engine 500 may have a single location, may be geographically distributed over a number of locations, or may be implemented as a cloud service.

As mentioned above, the disclosed embodiments may utilize audio files in any audio format. Some example formats may include OGG, FLAG, MP3, GSM, WAV, WAVPCM or any suitable format.

Upon acquisition of audio data, for example, from a phone call, video recording, or other source, a user may operate to provide the file to the processing engine 500 via, for example, a drag and drop method using the user interface 506 or by opening a default file management application. The processing engine 500 may operate to convert the file to a digital format if not already in a digital format and render the digital file in an uncompressed format that maintains the monophonic or stereophonic channelization, codified in a manner that meets conditions for voice biometric processing. For example, in some embodiments, the processing engine 500 may render a Waveform Audio File Format (.wav) file with a sample rate equal to or greater than 8 KHz and a resolution of at least 8 bits. The rendered digital file may be stored in the biometric voice print database 508 and indexed for future analysis. The rendered digital file may include a single monophonic channel or if stereophonic, the processing engine 500 may operate to separate the channels. Channel separation may be accomplished using an audio processing program designed to recognize multiple channels within the audio file and generate separate additional files for individual channels. As a result, the original file may be kept intact and an additional file for each channel may be generated. The original and additional files may be indexed and stored in the biometric voice print database 508 The one or more channels may be analyzed to separate different participants in the digital file.

The processing engine 500 may perform a segmentation analysis where the channel may be analyzed for the presence of one or more participants. The processing engine 500 may extract key datapoints and acoustic features from the speech of each individual participant in the digital file, for example pitch, cadence, and tone, to generate a model comprising unique characteristics of an individual participant's voice. The model may be used to determine a participant ID score to which other biometric voice prints may be compared to determine whether the participant ID scores meet a comparison threshold that indicates a match between biometric voice prints. In some embodiments, the segmentation analysis may be trained with an emphasis on conversations originating from equipment within the facility, may be language, accent, text, and channel independent, and may be audio source agnostic. The segmentation analysis may further operate to separate not only voices of individual participants, but also to isolate silence, signaling and other noise inherent in the recording that could otherwise interfere with subsequent analysis, evaluation, listening, or other operations that may be performed on the contents of the biometric voice print database 508. The segmentation process results in the generation of a separate voice print file for each individual who speaks in the recording, independent of speech generated by other participants, network signaling or noise. The number of participants present in the recording may also be rendered as a potential point of interest.

The processing engine 500 may then transform the model into a matrix that can be stored as a voice print in the biometric voice print database 508 in the form of, for example, a binary file. If the identity of the participant is known, the resulting voice print can then be assigned to the known participant via a participant identification record in the biometric voice print database 508. If the identity of participant is not known, the resulting voice print may then be assigned to a default participant, for example, Jaimie Doe, via a record in the biometric voice print database 508, and may be reserved for future identification. As mentioned above, the biometric voice print database 508 may be located in a memory of the processing engine 500.

The system may provide the user with the ability to create individual biometric voice print databases for later analysis, or may provide the user with the ability to create one or more custom indices of the biometric voiceprint database 508 related to participant identities, key words, or any other fields or records of the biometric voice print database for later analysis, sharing biometric voiceprint database records among authorized individuals or agencies, or for other authorized uses.

In addition to having the capability of processing a wide variety of audio formats, the system may also provide robust transcription and indexing of audio files. Currently, particularly when interacting with correctional center communication systems, users have been limited to analyzing recorded calls within the correctional center communication systems for intelligence and biometric analysis. The disclosed embodiments provide additional investigative capability by introducing audio files with inside and outside participants that may have initiated calls to, or received calls from, inside participants. Using the techniques described above, in addition to audio files with inside participants, audio files with outside participants may be converted to a format suitable for biometric processing, the converted files may be subject to segmentation analysis, voice print generation, participant identification and assignment, and location in the biometric voice print database.

The transcription process may include on demand transcription of unique rendered digital files, transcription of all files automatically, transcription of audio files in real time as the audio files are rendered, automatic language detection; and keyword and topic searching. The user interface may provide a transcription menu or other selection process that allows a user to select one or more rendered digital files for transcription, or may allow automatic transcription of all rendered digital files after rendering to meet conditions for voice biometric processing.

The transcription process may include an automatic language detection process which operates to analyze speech in an audio file and distinguish the languages spoken by the participants. The automatic language detection process provides the ability to offer notification, alerting and routing options based on the spoken languages, such as real time notification when a participant utters certain words or phrases in a particular language and may deliver language based statistics that can be used for resource planning and other management level tasks at a facility implementing the system. The automatic language detection process may combine Gaussian Mixture Modeling (GMM) with sophisticated techniques applied through an iVector based system to generate condensed and highly representative models that are used to analyze spoken language and generate a quantitative score assigned to languages that may be pre-trained and packaged in the system. The spoken language may be determined based on a comparison of the quantitative scores in as little as a few seconds of recorded speech.

The transcription process generally provides speech-to-text or voice-to-text services. Upon conversion to text, the system may refine the text output by applying participant segmentation analysis and identification where a biometric voice print is available and time alignment methods that delineate when one or another individual is speaking. Text formatting, and other adjustments are applied that improve the accuracy and readability of the output. The output may be stored and indexed in the voice print database 508 and made available on demand as a complete transcript of the audio file or in part via a keyword search tool (described below).

The transcription process may make use of a recognition network which may receive input from independent language models of details of specific words and how they are used in combination, and acoustic models that detail variations within language, e.g., UK English vs. US English, along with a pronunciation engine. The language model, acoustic model, and pronunciation engine inputs may be used collectively to compute hypotheses of words spoken in an audio file and decode all possible transcription results in weighted matrices, against which the most likely transcription result can be ascertained.

Transcription results may be made available in non-editable text and editable text formats, for example, PDF and DOCX, as some use cases require a wholly unbiased, machine-based output, and other use cases may require human editing of the transcription results to add emphasis, comments or other manual enhancements to the transcription results in an attempt to increase the usefulness of the transcription for a given readership.

Once transcribed, keyword indexing may enable investigators and administrative staff to manage challenges caused by the overabundance of data that would otherwise remain largely hidden in the audio files. This may be achieved by making the transcription results structured and text searchable. As a result, a user may accurately access key words and phrases within the context they were rendered when spoken.

Before keywords are indexed they may be extracted from the audio file using a term frequency-inverse document frequency method that may facilitate searching for and filtering transcripts from audio files that include specific topics. Keyword searching may be conducted in a single use, ad hoc manner or it can be "seeded" with a lexicon of default words, words spoken in a specific syntax, and phrases related to a given topic or context.

Some exemplary topics and phrases may include "Sexual Misconduct", "Threat Potential", and "Drug Related." The lexicons may be modified by the user to create custom and potentially shared templates from which notifications and alerts may be automatically generated when the established criteria is met. Some exemplary applications may include recognizing phrases such as "Call XXX-XXXOXXXX" which may indicate that a prohibited 3 way call may be attempted, and recognizing discussions about the weather that may indicate planning for unrest, disruptions, riots or escapes.

The disclosed embodiments advantageously facilitate user requests for biometric analysis of an audio file where a participant is believed to be an inside participant, former inside participant, an associate of a current or former inside participant, a person promoting criminal activity, or generally a POI. For example, a user may upload an audio file in which a participant presents a threat to an emergency operator. The user may then request that the system identify the participant from the pool of voice prints in the biometric voice print database 508 assigned to some or all participants that meet certain criteria, such as inside participants released over a specified time frame. As another example, the user may provide an audio file including speech from a POI and request the system return all calls that originate from the secure facility in which the person of interest is a participant.

As mentioned above, there is a need to identify the subject matter being discussed in electronic conversations involving inside and outside participants. The ability to discern particular words and phrases and their meanings, across a spectrum of different languages becomes important as the participants in the electronic conversations become more sophisticated in obscuring subjects being discussed, for example, by using non-traditional words and assigning alternate meanings to words and phrases.

The disclosed embodiments address the need to identify the subject matter being discussed by uncovering words and phrases in conversations that usually encompass an entire electronic communication, through the use of Artificial Intelligence (AI) and machine learning in order to "teach" the system what to look for and for the system to become more proactive vs reactive in its investigative capabilities. Additionally, the system can automatically generate alerts for investigators either in a real time or scheduled basis. These alerts can be based on the system's machine learning capabilities or can be based on rules created by investigators.

Figure 10:
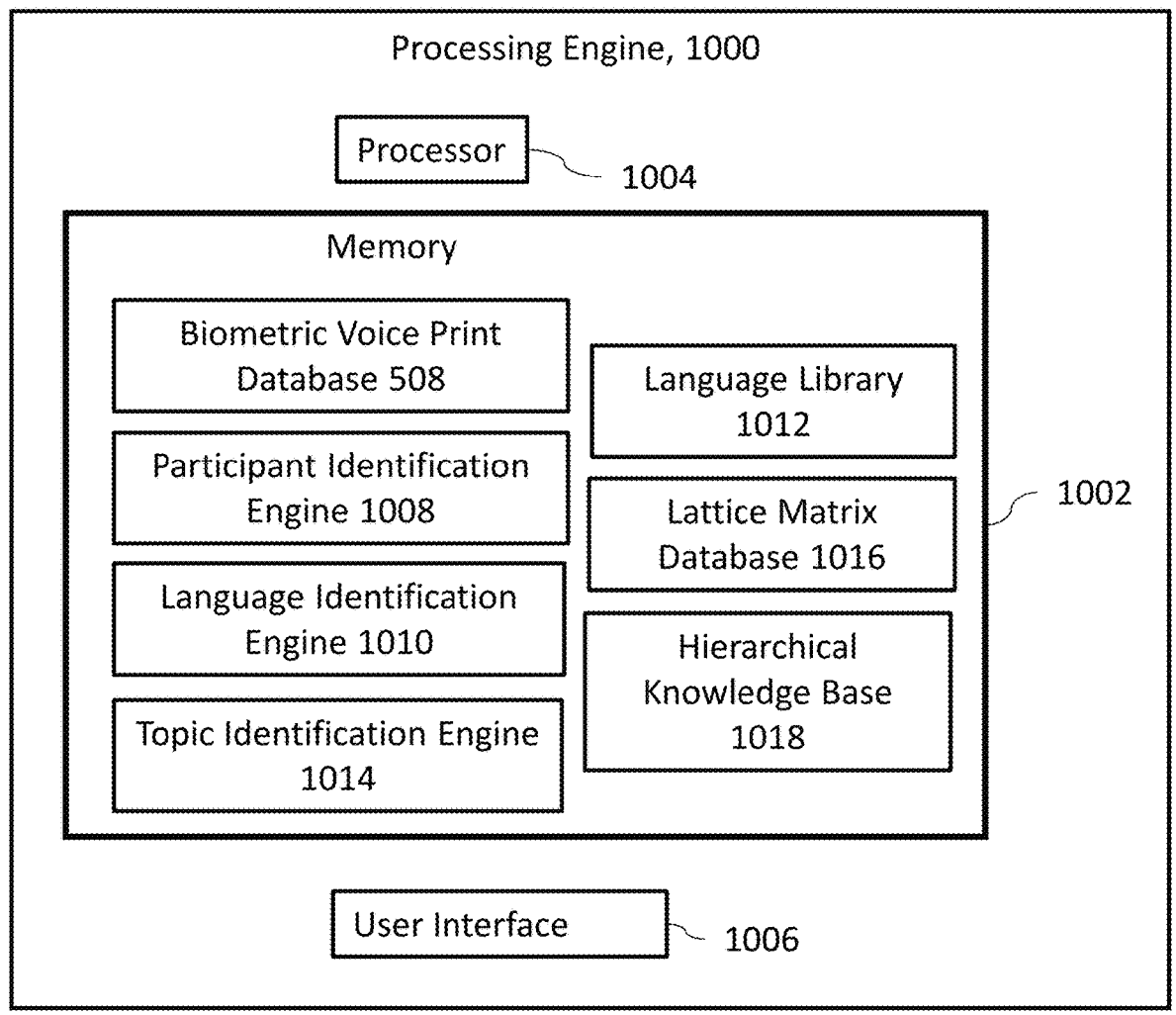
FIG. 10 illustrates an exemplary architecture of an improved processing engine.

FIG. 10 illustrates an exemplary architecture of an improved processing engine 1000 for implementing the system and methods of the processing engine 500 and for performing additional functions related to identifying topics and subject matter being discussed in addition to identifying the speakers in a variety of electronic communications.

The processing engine 1000 may include all the components and capabilities of processing engine 500 and computer readable program code stored on at least one computer readable medium 1002 for carrying out and executing the process steps described herein. The computer readable program code for carrying out operations for aspects of the present disclosure may be written in any combination of one or more programming languages, including the programming languages described above, or any other suitable programming languages. The computer readable program code may execute entirely on the processing engine 1000, partly on the processing engine 1000, as a stand-alone software package, partly on the processing engine 1000 and partly on a remote computer or server or entirely on the remote computer or server. In the latter scenario, the remote computer may be connected to the processing engine 1000 through any type of suitable network.

The computer readable medium 1002 may be a memory of the processing engine 1000. In alternate aspects, the computer readable program code may be stored in a memory external to, or remote from, the processing engine 1000, and may be implemented using media as disclosed above, or any media which is readable and executable by a computer.

The processing engine 1000 may also include a computer processor 1004 for executing the computer readable program code stored on the at least one computer readable medium 1002. The processing engine 1000 may include one or more input or output devices, generally referred to as a user interface 1006 which may operate to allow input to the processing engine 1000 or to provide output from the processing engine 1000, respectively. The processing engine 1000 may be implemented in hardware, software or a combination of hardware and software, and may have a single location, may be geographically distributed over a number of locations, or may be implemented as a cloud service.

The processing engine 1000 may generally include the biometric voice print database 508, a participant identification engine 1008, a language identification engine 1010, a language library 1012, a topic identification engine 1014, a lattice matrix database 1016, and a hierarchical knowledge base 1018.

The participant identification engine 1008, language identification engine 1010, and topic identification engine 1014 may be implemented using one or more machine learning models including one or more gated recurrent units (GRUs), long short term memory (LSTM) networks, fully convolutional neural networks (FCNs), generative adversarial networks (GANs), back propagation (BP) neural networks, radial basis function (RBF) neural networks, deep belief nets (DBN) neural networks, Elman neural networks, attention neural networks, or any machine learning model capable of performing the operations described herein.

The participant identification engine 1008, language identification engine 1010, and topic identification engine 1014 may be trained to recognize participants, language constructs, and topics of discussion, respectively, using supervised learning techniques with known training sets. In order to accomplish artificial intelligence applications, the participant identification engine 1008, language identification engine 1010, and topic identification engine 1014 may be trained to recognize participants, language constructs, and topics of discussion in a supervised manner. The input to the participant identification engine 1008, language identification engine 1010, and topic identification engine 1014 may be known participant BVPs, predetermined language constructs, and a known set of topics arranged in a hierarchy, and the resulting output of the participant identification engine 1008, language identification engine 1010, and topic identification engine 1014 may be estimated BVPs, estimated language constructs, and a set of estimated topics arranged in an estimated hierarchy. The estimated outputs may be compared to ground truth BVPs, language constructs, and topics and hierarchies, and the differences between the estimated outputs and the ground truth's may be back-propagated to update the parameters of the respective machine learning models to improve the accuracy of the estimations.

The participant identification engine 1008 may provide a facility to identify electronic communication participants inside the secure facility and those outside the secure facility using voice prints generated from a vetted pool of electronic conversations. The participant identification engine 1008 may analyze a pool of electronic conversations originating from a particular participant including electronic conversations that are diverse, that is, where the participant's voice may change based on variables such as tone, pitch, time of day, context and subjects being discussed, and other participants in the electronic conversation. The participant identification engine 1008 may check a dynamic list of attributes of each electronic conversation that may need to be satisfied for the electronic conversation to be included in the pool. The attributes may include but are not limited to, identification of devices used for the electronic conversation, time of day, duration, an amount of time during which the participant speaks, number of detected participants, signal to noise ratios, saturation levels, and any other attributes suitable for qualifying an electronic conversation for generating a voice print. The participant identification engine 1008 selects the electronic conversations that satisfy the most attributes for generating a voice print.

The participant identification engine 1008 constantly reviews the electronic conversations as new electronic conversations are added to the pool and may alert a user if the electronic conversations that satisfy the most attributes change, or may automatically generate a voice print based on an updated population of electronic conversations that satisfy the most attributes. The electronic conversation pool selection process and voice print generation may be performed for any number of inside and outside participants. It should be understood that the electronic conversation selection and voice print generation processes utilize each entire electronic conversation as opposed to different segments of an electronic conversation.

The participant identification engine 1008 may also operate to identify a target participant in one or more selected electronic conversations. An identifier signifying the target participant may be assigned to the electronic conversation, for example, an identifier that allows the target participant to participate in an electronic conversation. The participant identification engine 1008 initiates the identification process by determining if a voice print exists for the target participant associated with the identifier. If not, the participant identification engine 1008 may generate a voice print using the process described above. The participant identification engine 1008 may then preprocess the electronic conversation by, for example, separating a stereo electronic communication, removing voice prompts, increasing volume, and creating a .wav file of the electronic communication. The participant identification engine 1008 may utilize a participant diarization process that identifies and labels each portion, for example, each second, of the electronic conversation that appears to include a unique or different participant, and compares the portion to the electronic conversation while accounting for changes in characteristics of the target participant in the electronic conversation, for example, tone, pitch, time of day, context and subjects being discussed, and any other changes in participant characteristics within the electronic conversation. Portions of the electronic conversation that are confirmed as including a different participant are separated from the electronic conversation resulting in an increase in the amount of the electronic conversation that includes the target participant and provides a robust identification of the target participant.

The participant identification engine 1008 may inject a known audio signal in the channels carrying utterances from inside participants in order to differentiate the channels originating inside the secure facility from those originating outside the secure facility. For single channel electronic communications, the participant identification engine 1008 may utilize the features of processing engine 500 to separate the participants, remove voice prompts, make audio level adjustment, and further process the electronic communications using any of the capabilities of the processing engine 500. It should be understood that the participant identification engine 1008 may perform these operations for electronic conversations involving both inside and outside participants.

The language identification engine 1010 may include a natural language processor configured to perform automatic language identification to identify languages being spoken in the electronic communication and translate the different languages to a common language, using the language library 1012. The language library 1012 may include a number of user selected languages including dialects, regional variations, and language customizations that may be offered by a commercial provider or implemented by the language identification engine 1010. The language identification engine 1010 may use all languages in the language library 1012 to identify the languages being spoken in the electronic communication, or may use a user selected subset of the languages. Limiting the number of languages used for comparison may lower computing resources required for language identification and may allow for more precise translation. The identified languages may be used for transcription and phonetic indexing. The language identification engine 1010 may select the best candidate for language based on a best match criteria of intonations, phonetic pronunciations, vocabulary, and any other criteria suitable for determining a language.

The electronic communications and the language identification information may be provided to the topic identification engine 1014 which operates to identify topics of interest discussed during the electronic communications. The topic identification engine 1014 operates to create a hierarchy of language constructs where the lowest level may include a dictionary or thesaurus, a mid-level may include groupings of words, phrases, and paragraphs, an upper level may be designated by a subject, and a top level may be designated by a topic. The hierarchy of language constructs may include any number of levels. The topic identification engine 1014 may begin operation using an unpopulated or partially populated hierarchy and processes the electronic communications to populate the hierarchy. Associations among words, phrases, paragraphs, subjects, and topics may initially be user defined. However, even without user associations, the topic identification engine 1014 processes the electronic communications, and populates the hierarchy of language constructs to develop the hierarchical knowledge base 1018 from which to identify topics discussed in the electronic communications.

For example, a user could associate "Cocaine" with a group called "Drugs" at a higher level in the hierarchical knowledge base 1018 and that group can be added to a category called "Illicit Substances" at an even higher level of the hierarchical knowledge base 1018. By making these associations, either user or system defined, the topic identification engine 1014 may learn and look for other known drugs using machine learning, and as electronic communications calls are processed, may populate the hierarchical knowledge base 1018.

Every word or phrase of an electronic communication may be indexed in the lattice matrix database 1016 with not just a best word or phrase match but also with alternative matches. The resulting transcription of the conversation may be based on the best match words and phrases.

The topic identification engine 1014 further operates to transcribe the electronic communications and provide various reports in different formats. The reports may be based on searches based on one or more of, or any combination of, a date range, a particular word, phrase, sentence, paragraph, etc., a frequency of a particular word, phrase, sentence, paragraph, etc., a particular inside participant, a particular outside participant, a particular language, a particular destination, a particular gender of a participant, or any other suitable criteria.

Additional search criteria may include a key word search limited to only utterances by an inside participant, only utterances by an outside participant, or utterances by both the inside and outside participants for a particular electronic communication, a range of electronic communications, or all electronic communications. Still additional search criteria may include an exact phrase present in any particular electronic communication, a range of electronic communications, or all electronic communications.

Any search criteria may be modified by one or more logical operators, for example, "AND," "OR," "exclusive OR (XOR)," and "NOT." It should be understood that any search criteria may be combined with any number of other search criteria and any of the search criteria may be modified with any combination of the logical operators. The topic identification engine 1014 utilizes the search criteria to analyze the lattice matrix database 1016 and aggregate the records in the database that satisfy the search criteria into a report, which may be displayed on the user interface 1006.

Figure 11:
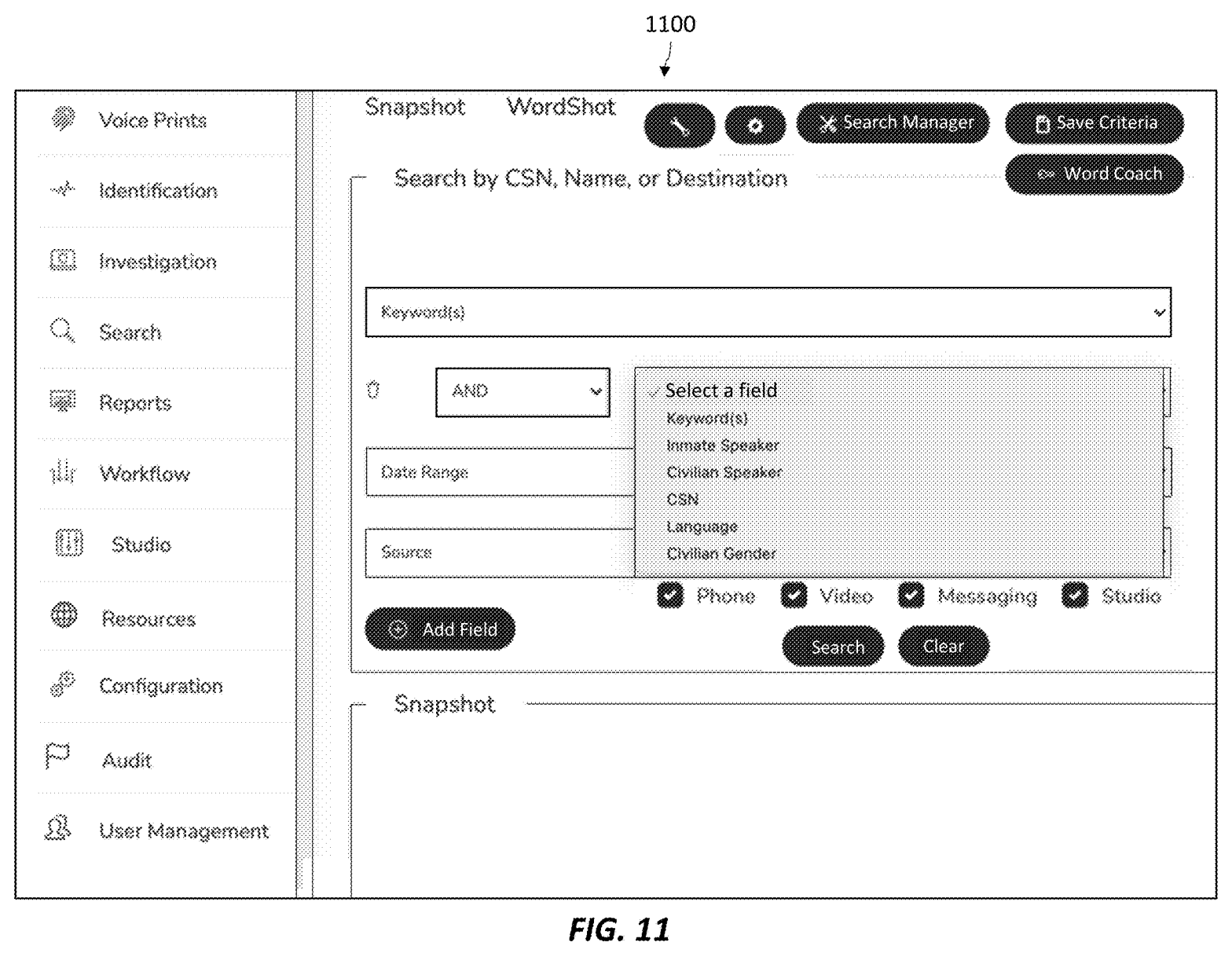

FIG. 11 shows an exemplary user interface 1100 for generating a report. Any of the reports may be generated automatically on a user specified schedule, and may be presented as a spreadsheet, a text document, a URL that links to one or more reports stored in the memory 1002 of the processing engine 1000, or in any suitable format. Any of the reports may be interactive in that by clicking on, or otherwise selecting one of the results, a list of the communications in which the result is present may be presented for playback. One of the communications may be selected and at least a portion played back. For example, the selected communication may include the previous 5 seconds, or some other user selectable time period, before the result is present in the commination, and a transcription may be displayed of the portion of the communication as the portion is being played with the result highlighted. In some embodiments, the portion of the transcription may be displayed along with the list of communications. The report may allow a user to jump among the results using an input device of the user interface 1006.

Figure 12:
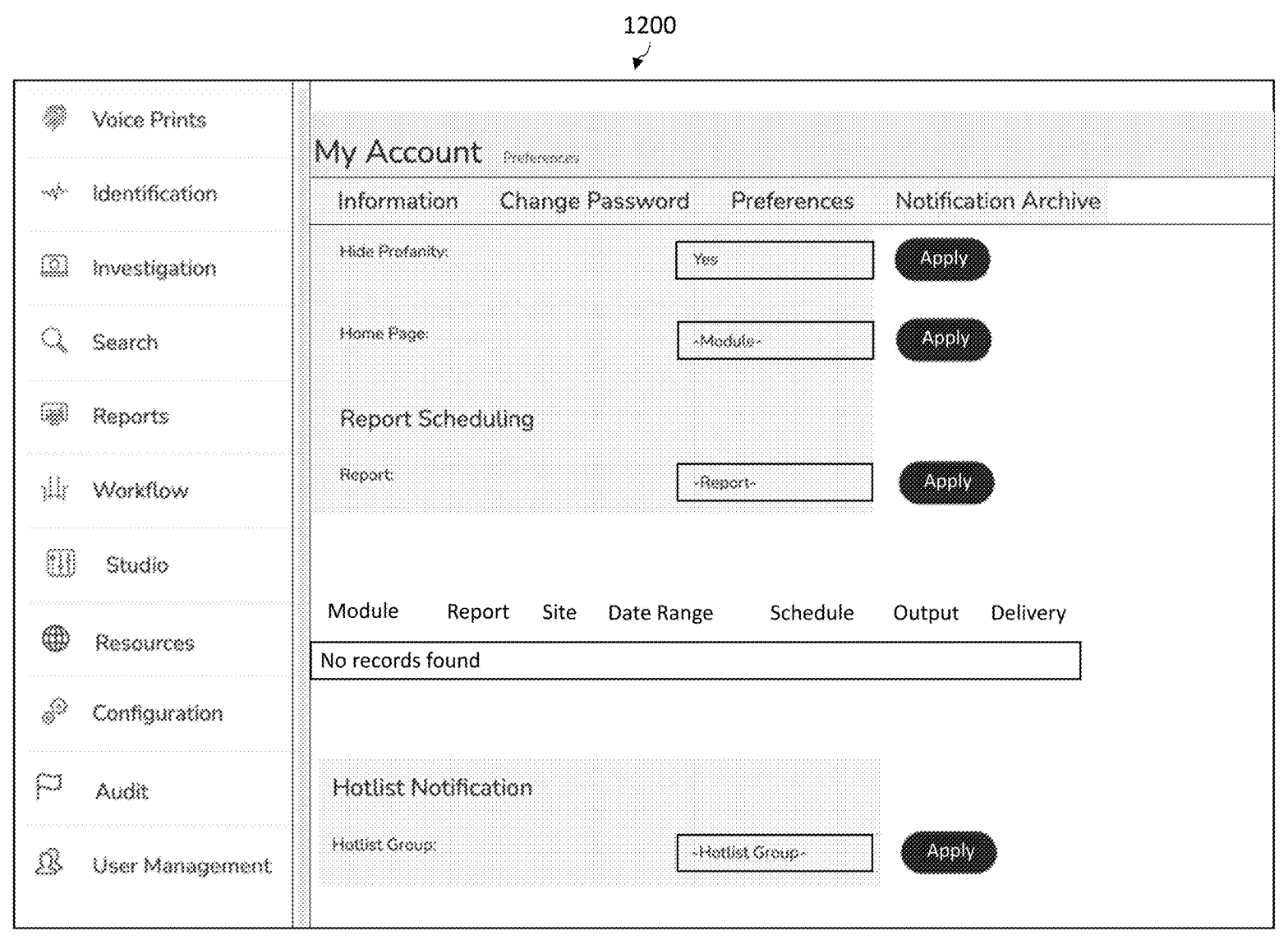

FIG. 12 shows a portion 1200 of the user interface 1100 that allows a user to filter report results. Based on input from the user, the topic identification engine 1014 may filter out words that have no weight in a conversation i.e. "filler" words such as "a, the, or, and, umm, etc," may filter out explicit words, or any word, words, or phrases designated by a user.

Figure 13:
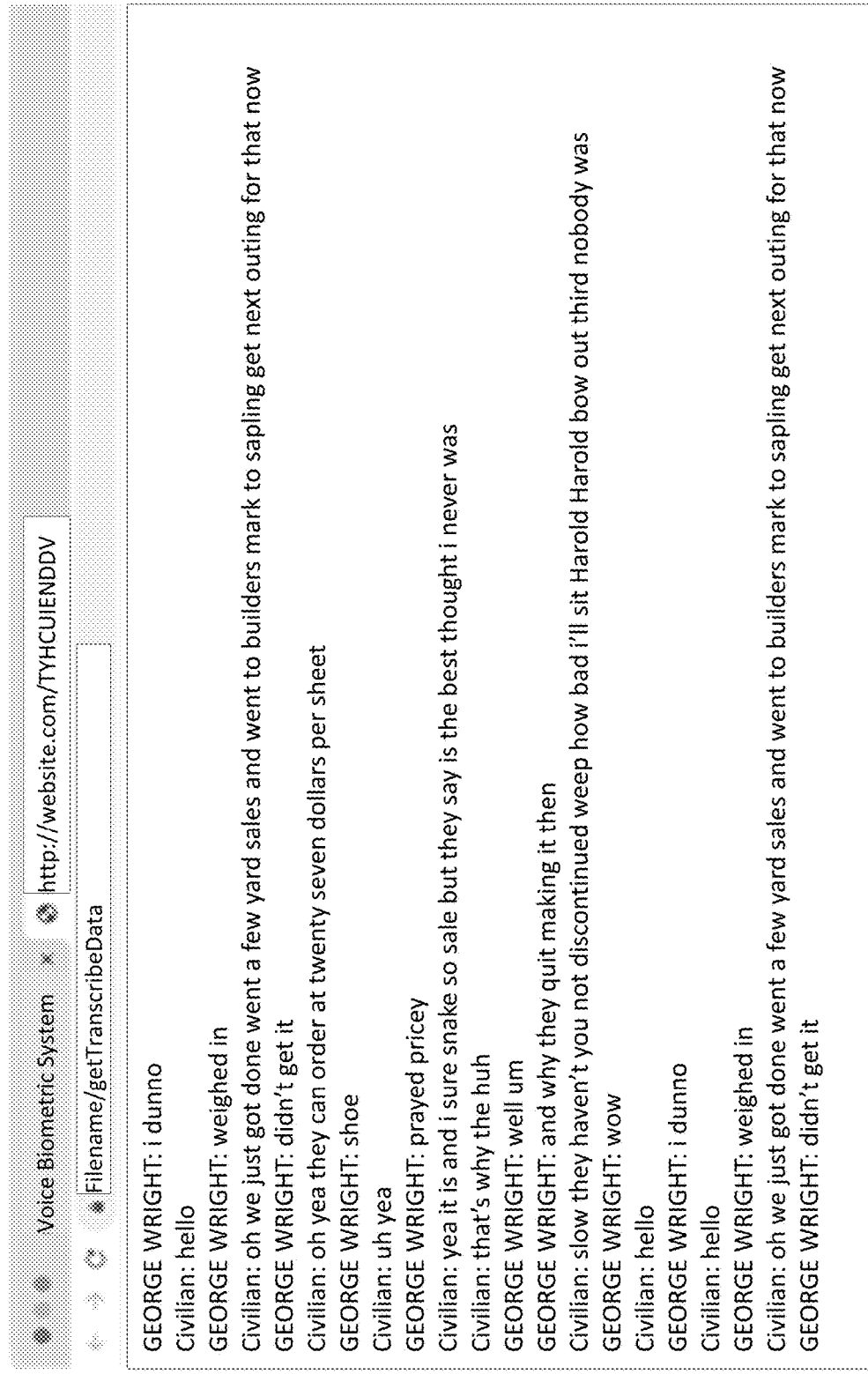
FIG. 13 illustrates an exemplary report showing a transcription of a communication between participants.

FIG. 13 illustrates an exemplary report 1300 showing a transcription of a communication between an inside participant 1302, designated in capital letters, and an outside participant 1304, designated as a "civilian."

Figure 14:

FIG. 14 illustrates an exemplary report 1400 that presents the most frequently said words during a particular period. The period may be user selectable or provided as a system default, for example, 7 days, 15 days, etc. The most frequent words report 1400 may display the most frequently said words uttered by an inside participant, by an outside participant, during a communication to a particular destination, or any other criteria or combination of criteria available. The most frequent words report 1400 may be produced in a graphical format. For example, as shown in FIG. 14, words may be displayed in font sizes corresponding to the number of times spoken, with larger fonts corresponding to larger numbers and smaller fonts corresponding to smaller numbers.

The most frequent words report 1400 may also be produced as a list in frequency order, as shown as item 1500 in FIG. 15. This version 1500 of the report may show the word 1502, the number of combined utterances 1504 between an inside participant and an outside participant, a breakdown of how many utterances were said by the inside participant 1506 and the outside participant 1508 along with a corresponding number of communications where those utterances occurred.

The most frequent words reports 1400, 1500 may be interactive in that by clicking on, or otherwise selecting a word, a list of the communications in which the word is present may be presented for playback. One of the communications may be selected and at least a portion played back. For example, the selected communication may be indexed 5 seconds, or some other user selectable time period, before the word is said and a transcription displayed of the portion of the communication as the portion is being played with the word highlighted. In some embodiments, the portion of the transcription may be displayed along with the list of communications.

The most frequent words reports 1400, 1500 may also provide the ability to hide and exclude certain utterances, where hiding an utterance removes it from the report such that it is know longer seen by the user without being permanent, simply a one time removal, and excluding an utterance which permanently removes the utterance from the report. This may be useful in cases of common words which may be frequent but their frequency hides potential intelligence from other words. Users may either delete the utterances by selecting them from a previously run report or may manually add them to an exclusion list.

The most frequent words reports 1400, 1500 may also provide an ability to filter out explicit words with a simple toggle.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A method of providing a transcription of an electronic communication, comprising:
   using a language identification engine to determine a language spoken in the electronic communication;
   using a participation identification engine to differentiate among participants in the electronic communication;
   using a topic identification engine to identify a hierarchy of topics discussed in the electronic communication and transcribe the electronic communication using the determined language by converting the electronic communication to text and applying participant segmentation analysis and time alignment methods that delineate when one or another individual is speaking;

implementing the participation identification engine, language identification engine, and topic identification engine using a machine learning model trained using known participant biometric voice prints, predetermined language constructs, and a known set of topics; and providing a display of the transcription, the participants, the determined language, and the hierarchy of topics.

2. The method of claim 1, wherein the electronic communication is a live or recorded electronic communication between one or more participants within a corrections facility and one or more participants outside of the corrections facility.

3. The method of claim 2, wherein the live or recorded electronic communication is at least one of a telephone call, video call, email, text message, streaming audio and video, or audio loaded from outside sources.

4. The method of claim 1, wherein the language is selected from a library of languages.

5. The method of claim 4, wherein the language is selected based on a best match of one or more of intonations, phonetic pronunciations, and vocabulary.

6. The method of claim 1, comprising inserting a tone in a particular participant's portion of the electronic communication to differentiate among the participants.

7. The method of claim 1, comprising identifying the topics using rule based criteria.

8. The method of claim 1, comprising identifying the topics using user defined criteria.

9. The method of claim 1, comprising identifying the topics by indexing words of the electronic communication in a lattice matrix database with a best match and alternatives for each word.

10. The method of claim 1, wherein the display of the hierarchy of topics illustrates most pronounced topics in a larger font.

11. The method of claim 1, comprising providing a searching facility to search the electronic communication for one or more of:
a topic;
a particular word, phrase, sentence, or paragraph;
a particular participant's voice
a particular language;
a particular destination number;
a particular participant's gender.

12. The method of claim 1, comprising providing alerts based on one or more criteria comprising:
a topic;
a particular word, phrase, sentence, or paragraph;
a particular participant's voice
a particular language;
a particular destination number;
a particular participant's gender.

13. The method of claim 1, comprising operating the participation identification engine to analyze electronic conversations originating from particular participants to differentiate among the participants, the electronic conversations satisfying attributes including one or more of devices used for the electronic conversations, time of day, duration, an amount of time during which the participants speak, number of detected participants, signal to noise ratios, and saturation levels.

14. The method of claim 1, wherein the language identification engine comprises a natural language processor configured to perform automatic language identification of languages spoken in the electronic communication and translate the identified languages to a common language using a language library.

15. The system of claim 14, comprising selecting a limited number of languages for use by the language library to lower computing resources required for language identification and to provide precise translation.

16. A system for providing a transcription of an electronic communication, comprising:
a processor;
a computer readable medium storing computer readable program code, that when executed by the processor, causes the processor to implement:
a participation identification engine for differentiating among participants in the electronic communication;
a language identification engine for determining a language spoken in the electronic communication; and
a topic identification engine for identifying a hierarchy of topics discussed in the electronic communication and for transcribing the electronic communication using the determined language by converting the electronic communication to text and applying participant segmentation analysis and time alignment methods that delineate when one or another individual is speaking,
wherein the participation identification engine, language identification engine, and topic identification engine are implemented using a machine learning model trained using known participant biometric voice prints, predetermined language constructs, and a known set of topics; and
a user interface for providing a display of the transcription, the participants, the determined language, and the hierarchy of topics.

17. The system of claim 16, wherein the electronic communication is a live or recorded electronic communication between one or more participants within a corrections facility and one or more participants outside of the corrections facility.

18. The system of claim 17, wherein the live or recorded electronic communication is at least one of a telephone call, video call, email, text message, streaming audio and video, or audio loaded from outside sources.

19. The system of claim 16, wherein the language is selected from a library of languages.

20. The system of claim 19, wherein the language is selected based on a best match of one or more of intonations, phonetic pronunciations, and vocabulary.

21. The system of claim 16, wherein the participation identification engine operates to insert a tone in one participant's portion of the electronic communication to differentiate among the participants.

22. The system of claim 16, wherein the topic identification engine operates to identify the topics using a rule based criteria.

23. The system of claim 16, wherein the topic identification engine operates to identify the topics using user defined criteria.

24. The system of claim 16, wherein the topic identification engine operates to identify the topics by indexing words of the electronic communication in a lattice matrix database with a best match and alternatives for each word.

25. The system of claim 16, wherein the topic identification engine causes the user interface to display the most pronounced topics of the hierarchy of topics in a larger font.

26. The system of claim 16, wherein the topic identification engine operates to provide a searching facility to search the electronic communication for one or more of:
- a topic;
- a particular word, phrase, sentence, or paragraph;
- a particular participant's voice
- a particular language;
- a particular destination number;
- a particular participant's gender.

27. The system of claim 16, wherein the topic identification engine operates to provide alerts based on one or more criteria comprising:
- a topic;
- a particular word, phrase, sentence, or paragraph;
- a particular participant's voice
- a particular language;
- a particular destination number;
- a particular participant's gender.

28. The system of claim 16, wherein the participation identification engine operates to analyze electronic conversations originating from particular participants to differentiate among the participants, the electronic conversations satisfying attributes including one or more of devices used for the electronic conversations, time of day, duration, an amount of time during which the participants speak, number of detected participants, signal to noise ratios, and saturation levels.

29. The system of claim 16, wherein the language identification engine comprises a natural language processor configured to perform automatic language identification of languages spoken in the electronic communication and translate the identified languages to a common language using a language library.

30. The system of claim 29, wherein the language library comprises a limited number of languages selected to lower computing resources required for language identification and to provide precise translation.

* * * * *